United States Patent [19]
Duff et al.

[11] Patent Number: 4,485,440
[45] Date of Patent: Nov. 27, 1984

[54] CENTRAL PROCESSOR UTILIZATION MONITOR

[75] Inventors: Thomas G. Duff, Tinton Falls; Chester S. Zaluk, Middletown, both of N.J.

[73] Assignee: AT&T Bell Laboratories, Murray Hill, N.J.

[21] Appl. No.: 579,370

[22] Filed: Feb. 13, 1984

Related U.S. Application Data

[63] Continuation of Ser. No. 305,122, Sep. 24, 1981, abandoned.

[51] Int. Cl.³ ...................... G06F 11/32; G06F 11/34
[52] U.S. Cl. ..................................... 364/300; 364/200
[58] Field of Search ... 364/200 MS File, 900 MS File, 364/300; 371/19

[56] References Cited

U.S. PATENT DOCUMENTS 3,893,084 7/1975 Kotok et al. ...................... 364/200
4,432,051 2/1984 Bogaert et al. ...................... 364/200
4,435,759 3/1984 Baum et al. .......................... 364/200

Primary Examiner—Raulfe B. Zache
Assistant Examiner—A. E. Williams, Jr.
Attorney, Agent, or Firm—Thomas Stafford

[57] ABSTRACT

Data relative to code instruction use of a central processor unit (CPU) is collected by accumulating counts of code instructions to be executed upon termination of a clock interrupt process over a predetermined interval. Information stored on occurrence of a clock interrupt pulse is evaluated to determine if the code instruction is one under evaluation. If the code instruction is one under evaluation, a count in an associated memory location is incremented. Upon termination of the predetermined interval, the data is read out in histogram form. The data in the histogram is relative to the virtual addresses of the code instructions and, therefore, directly useable by a programmer to evaluate the code use of the CPU without the need for costly and time consuming data unmapping.

12 Claims, 5 Drawing Figures

CENTRAL PROCESSOR UTILIZATION MONITOR

This application is a continuation of a parent application Ser. No. 305,122, filed Sept. 24, 1981, now abandoned.

TECHNICAL FIELD

This invention relates to monitoring systems and, more particularly, to a method of monitoring software code utilization of a central processor unit in a computer system.

BACKGROUND OF THE INVENTION

In a computer system it is both desirable and useful to determine how efficiently a resource is being used. It is particularly useful to monitor software code utilization of a central processor unit (CPU). A most meaningful measure is the product of code utilization and time spent in the execution of each code instruction. Typically, 10 percent of the code instructions require 90 percent of the CPU time utilized. An evaluation of this 10 percent of the code instructions through monitoring of the particular code module including those instructions can result in more efficient use of the CPU.

Heretofore, such evaluation was realized by use of a separate hardware monitor. Prior monitor arrangements were typically hand-wired to test locations in a CPU back plane and used to collect date relative to the physical addresses of the code and not the virtual code addresses. As is well known, the physical address is typically different from the virtual address. Consequently, the data collected relative to physical addresses must be unmapped or reduced in order to determine which code instructions were actually using the CPU. It is the virtual address information that is useful to a programmer. This is especially a problem in computer systems using memory management techniques. By way of example, each individual program subroutine is written by a programmer in a manner such that the code instruction numbering begins at address zero. However, since numerous subroutines are employed in a computer system, the specific code instructions of a routine may be stored in memory locations beginning with an address of, for example, 80,000,000. This 80,000,000 number is the virtual address of the first code instruction of the subroutine. The 80,000,000 virtual address may correspond to a physical address of zero. Similarly, instructions of another subroutine may have virtual addresses of zero to 5,000 while the corresponding physical addresses are 5,000 to 10,000. Consequently, data accumulated by addressing physical locations via the prior hardware monitors must be unmapped to obtain information relative to the virtual addresses of the code instructions. Again, it is the virtual address information which is then useable by the programmer for evaluating code efficiency.

Such hardware monitors are further undesirable because of their cost and the need for time-consuming data reduction. Furthermore, they are not readily adaptable for use with newer CPUs since there is less access in the newer CPUs because of the lack of physical test positions to connect to.

SUMMARY OF THE INVENTION

More efficient monitoring of code instruction utilization of a central processor unit (CPU) in a computer system is realized in accordance with an aspect of the invention by determining from information stored on occurrence of each clock interrupt pulse in the computer system interrupt process whether a code instruction associated with the stored information is in a program module under evaluation. Representations of the code instructions being evaluated are accumulated for a predetermined interval and, then, directly used to evaluate code utilization of the central processor unit.

More specifically, a processor status longword and a program counter longword both stored on the occurrence of each clock interrupt pulse, are employed to determine if the associated code instruction to be executed upon termination of the occurrence of each clock interrupt process is in a code instruction module being evaluated. If the code instruction is one being evaluated, the program counter longword is employed as an "offset" to increment a count stored in a memory location associated with the individual code instruction. After a predetermined interval, the code instruction counts stored in the associated memory locations are read out and are directly useable to evaluate code use of the central processor unit. In one application, the accumulated counts of code instructions are directly extracted in the form of a histogram for purposes of evaluating the software code performance.

BRIEF DESCRIPTION OF THE DRAWING

The invention will be more fully understood from the following detailed description of an illustrative embodiment thereof taken in connection with the appended figures in which.

DETAILED DESCRIPTION

Figure 1:
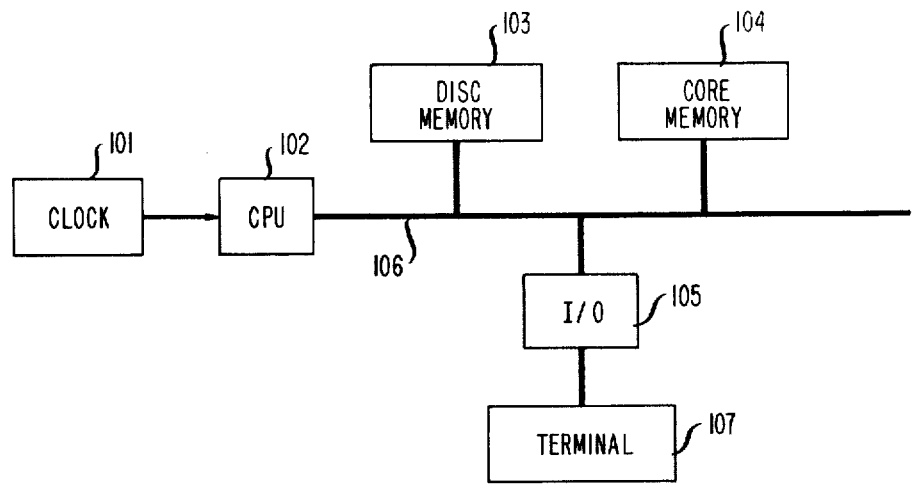
FIG. 1 shows in simplified block diagram form a computer system on which the invention may be practiced.

FIG. 1 shows in simplified block diagram form details of a computer system in which an embodiment of the invention may be employed to accumulate data regarding code use of a central processor unit (CPU). Accordingly, shown are clock unit 101, CPU 102, disk memory unit 103, memory unit 104, input/output unit (I/O) 105 and access terminal 107. CPU 102, disk memory 103, memory 104 and I/O 105 are interconnected via bus 106 to form a computer system. Terminal 107 is employed both to input and output information from the computer system in well-known fashion. In this example, not to be construed as limiting the scope of the invention, CPU 102 is a Digital Equipment Corporation (DEC), VAX-11/780 commercially available and described in VAX-11/780, Hardware Handbook, 1979-1980, Digital Equipment Corporation and VAX-11/780, Architecture Handbook, 1979-1980, Digital Equipment Corporation. As will be apparent to those skilled in the art, the other peripheral units used in the computer system are compatible with the DEC CPU 102.

Figure 2:
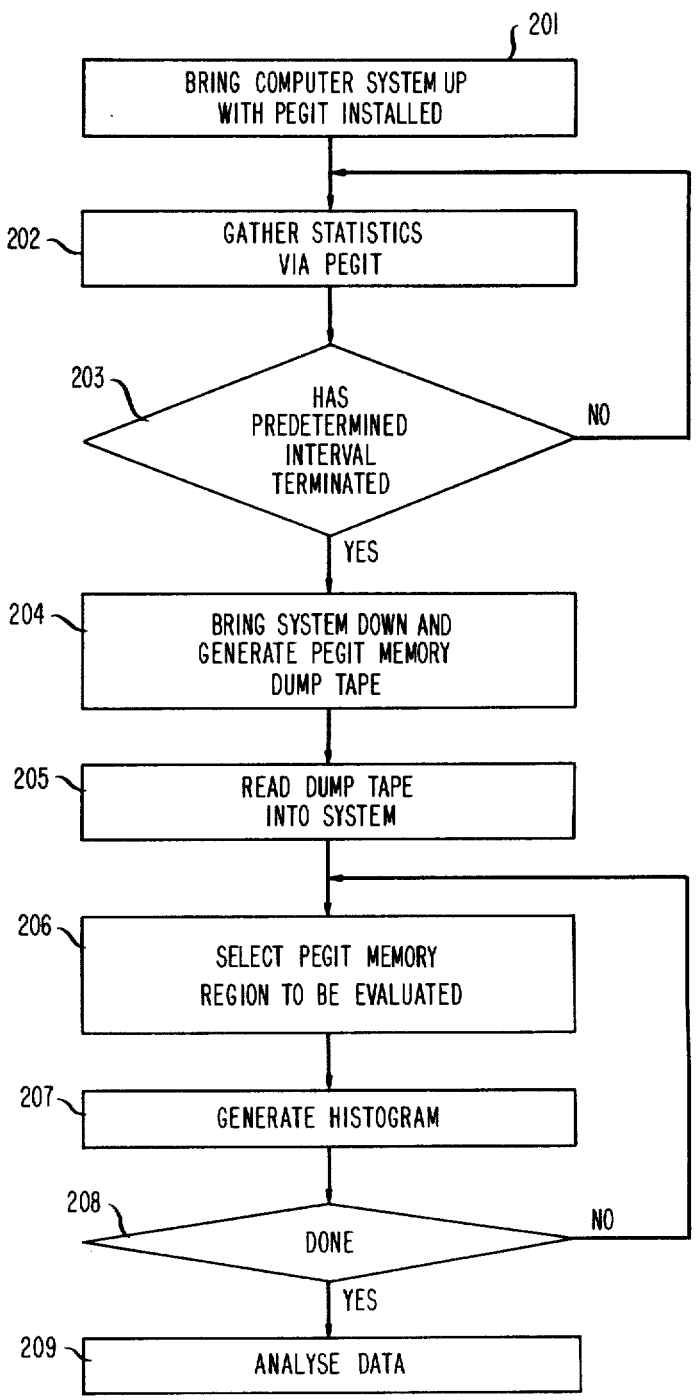
FIG. 2 is a flow chart illustrating a sequence of system steps including use of the invention.

FIG. 2 shows in flow chart form the generalized operation of the computer system including an embodiment of the invention, namely, PEGIT. Details of the PEGIT subroutine are described below. Thus, operational block 201 indicates that the computer system is made operative including PEGIT. Then, statistics on code use in the computer system are gathered by utilization of the invention, i.e., PEGIT, as indicated in block 202. The statistics are gathered for a predetermined interval as controlled by conditional branch point 203. The predetermined interval may be of any desired length of time, e.g., 24 hours. After collecting the statistics on code utilization for the predetermined interval, the computer system is brought down and a PEGIT memory dump tape is generated as indicated in block 204. The PEGIT memory dump tape includes information on the number of times a particular code instruction used the CPU 102 during the predetermined interval. Additional information relating to type of code instruction, e.g., kernel, user, device driver or idle is also included on the PEGIT memory dump tape. The PEGIT memory dump tape is thereafter read into the system as indicated in block 205. Then, a particular memory region or module, i.e., predetermined portions of the accumulated data, to be evaluated is selected as indicated in block 206. The module selected may be, e.g., the section of the kernel of the code that uses most of the CPU time available. Similarly, if it is desired to evaluate user use, the instructions pertaining to users may be equally evaluated, as may the instructions relating to device driver use. Once the dump tape memory region containing the code module to be evaluated is selected it may read out in any desired form. One useful form is a histogram, i.e., a graphical representation, which may be generated in well-known fashion as indicated in block 207. Once the desired histogram or histograms are generated as controlled by conditional branch point 208, the data is then analyzed as indicated in block 209.

Figure 3:
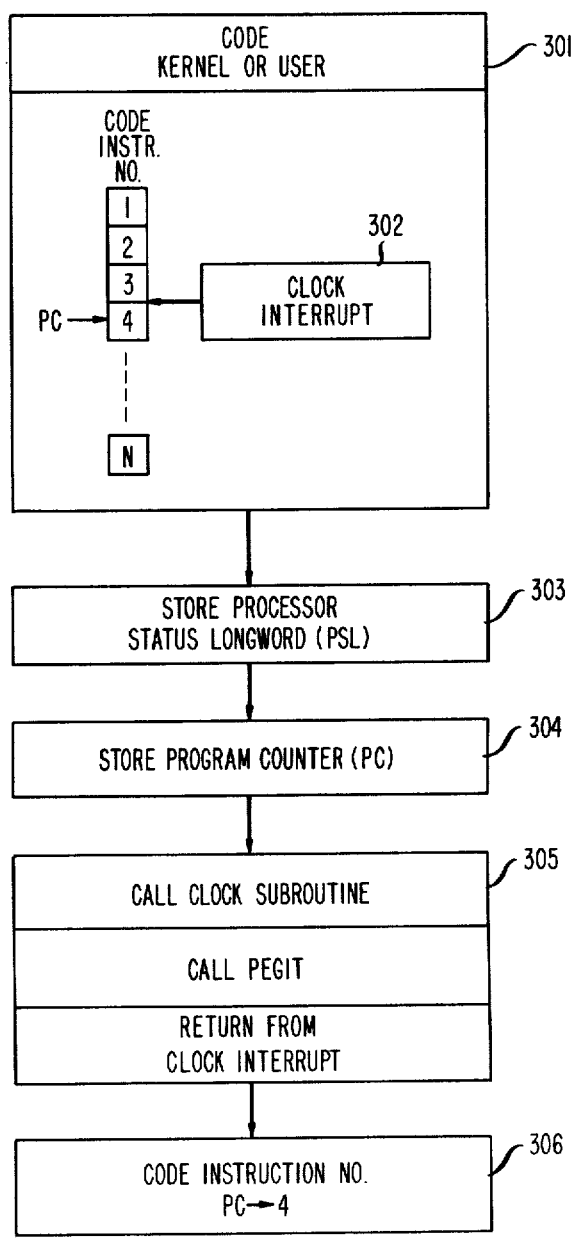
FIG. 3 is a flow chart useful in describing the operation of the invention in a computer system.

FIG. 3 shows in simplified form a flow chart illustrating operational steps in a computer system including an embodiment of the invention. Accordingly, block 301 indicates, in this example, either kernel mode or user mode code use of CPU 102. The kernel code is, for example, the central part of an operating system which manages use of the computer system resources. It is typically the most privileged processor access mode. The most privileged operating system services, e.g., device drivers and pager are included in the kernel code. Kernel code is divided into base kernel and device drivers. Base kernel includes all kernel code instructions except device driver code instructions. User code is all other code instructions. User mode of code operation is typically the least privileged processor access mode. As diagrammatically shown in block 301, a code instruction, e.g., instruction 4, about to be fetched by CPU 102 as indicated by program counter word PC, is interrupted via block 302 upon occurrence of a clock pulse. Upon occurrence of the clock interrupt pulse, information relating to the code instruction use of CPU 102 is stored, namely, a processor status longword (PSL) or first code word as indicated in block 303 and a program counter longword (PC) or second code word as indicated in block 304. PSL includes a plurality of bits, in this example 32, which are stored in a register of CPU 102. Predetermined ones of the PSL bits, include information identifying the access mode of the interrupt code instruction, i.e., kernel or user and the kernel priority level. PC also includes a plurality of bits, in this example 32, which are stored in a register of CPU 102. Predetermined ones of the PC bits contain information identifying the virtual address of a location in memory from which CPU 102 will fetch the next code instruction it will execute, in this example, the virtual address of program instruction 4. Predetermined others of the bits of PC contain information identifying whether the code instruction is in the base kernel or a device driver. For purpose of this description, PC containing the virtual address of a code instruction to be executed means that the code instruction is counted as though executed by CPU 102. Thus, PSL identifies the type code instruction, i.e., kernel or user and PC identifies the virtual address of the particular code instruction and type of code instruction use within kernel. The stored information is utilized in accordance with an aspect of the invention for accumulating data on code instruction use of CPU 102. Since the stored PC bits include the virtual address of the code instruction, there is no need for costly and time-consuming unmapping, as was required with the prior hardware monitors which would only address physical locations in the computer systems. The data accumulation is realized by including in the clock service or interrupt subroutine an embodiment of the invention, namely, PEGIT, which controls accumulation of data on the code instruction upon each occurrence of the clock interrupt. Block 305 indicates that the clock subroutine is called upon clock interrupt, the subroutine includes PEGIT, to be described below and after the interrupt, CPU 102 is returned to complete the code instruction interrupted. In this example, code instruction 4 is then executed by CPU 102 as indicated in block 306.

Figure 4:
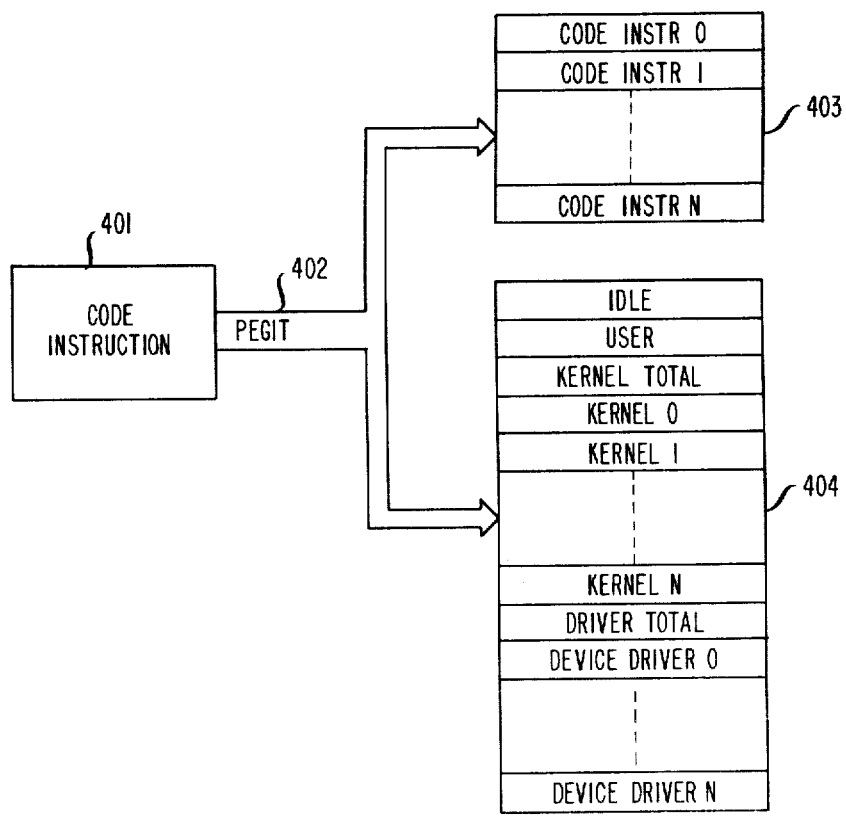
FIG. 4 is a graphical representation of information flow in the system employing the invention.

FIG. 4 illustrates in graphical form operation of PEGIT 402 in storing representations of the code instruction 401 to be executed by CPU 102. As described below, PEGIT 402 employs program counter longword PC associated with the code instruction and including the instruction virtual address as an "offset" to increment a count in an associated location in memory 104 to form table 403 of code instruction use. That is to say, each code instruction in a program module to be evaluated, for example, base kernel has an associated memory location in memory 104, namely, code instructions 0 through N memory locations to form table 403. Similarly, it is also desirable to accumulate data on specific modes of CPU 102 operation or use, for example, idle, user, kernel total, kernel priority, driver total and specific drivers. The information identifying these modes is also obtained from the processor status longword (PSL) and/or the program counter longword (PC). Representations of the count of each use are obtained by incrementing a count stored in associated locations in memory 104, namely, but not limited to idle, kernel total, kernel priority 0 through N, driver total and device driver 0 through N memory locations to form table 404. The stored information in tables 403 and 404 pertains to the virtual addresses of the code instructions and can be directly read out for use by a programmer without need of costly and time-consuming data reduction as was required in prior hardware monitors.

Figure 5:
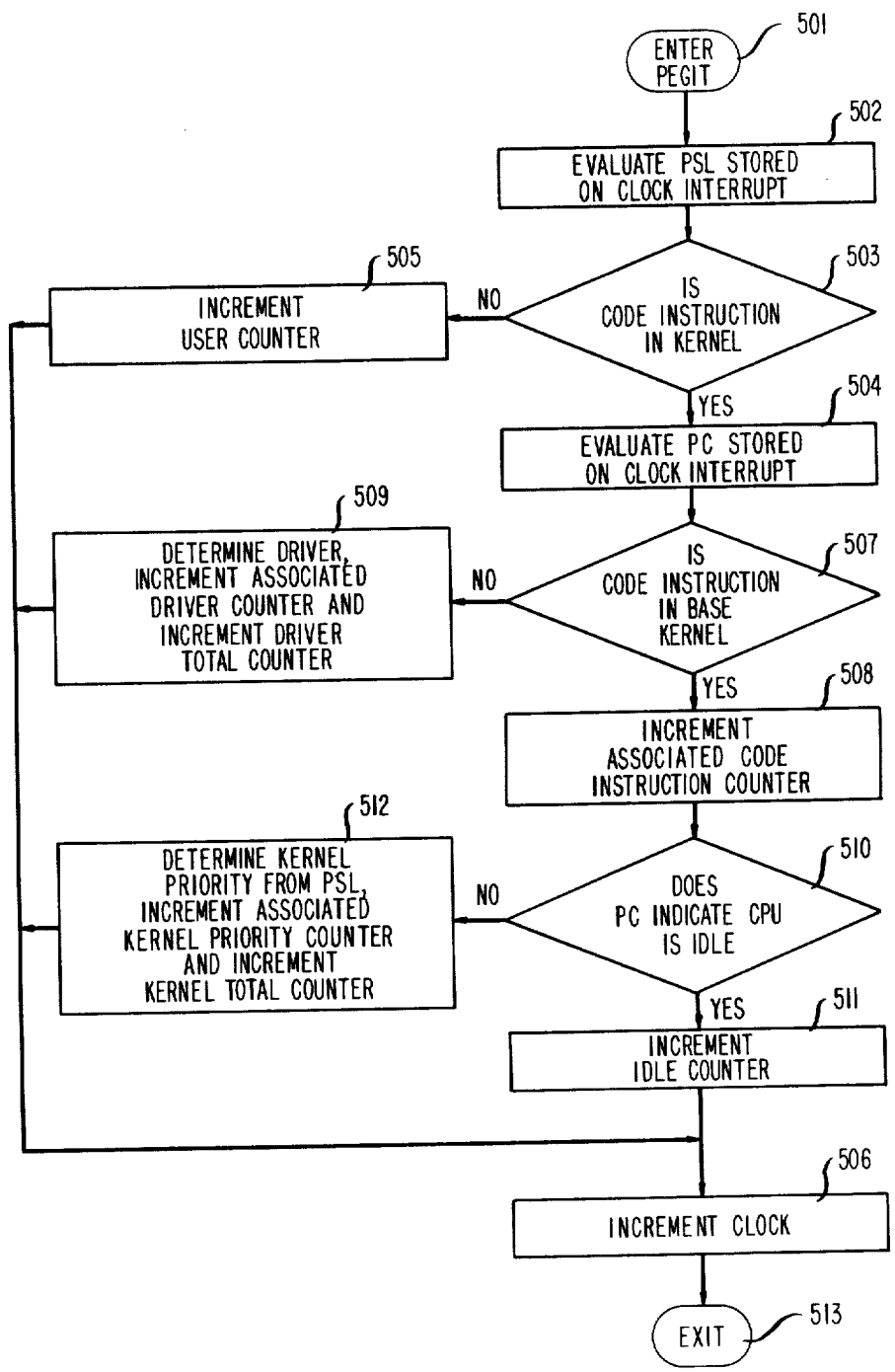
FIG. 5 is a flow chart illustrating a sequence of steps used in one embodiment of the invention for accumulating data on code utilization of a central processor unit.

FIG. 5 is a flow chart illustrating steps of the PEGIT subroutine used in the computer system interrupt subroutine and incorporating the invention. Accordingly, PEGIT is entered via oval 501. Operational block 501 causes predetermined bits of PSL stored on clock interrupt to be evaluated. Conditional branch point 503 tests the PSL bits to determine if the code instruction is in kernel. If the test result is NO, the code instruction to be executed is a user instruction and operational block 505 causes the count in an associated user location in memory 104 to be incremented to generate a user count in table 404. Thereafter, control is transferred to operational block 506. If the test result is YES, the code instruction is in kernel. Operational block 504 causes predetermined bits of PC stored on clock interrupt to be evaluated. Conditional branch point 507 tests the PC bits to determine if the code instruction to be executed is in base kernel. If the test result is NO, the code instruction is in a device driver subroutine. Then, operational block 509 determines from predetermined bits of PC which device driver the code instruction to be executed is in, causes a count in a location in memory 104 associated with the device driver to be incremented, and causes a count in a location in memory 104 associated with device driver total use to be incremented. Thereafter, control is transferred to operational block 506. If the test result of conditional branch point 507 is YES, the code instruction to be executed is in the base kernel. Operational block 508 causes a count stored in a location of memory 104 associated with the code instruction to be executed as identified by bits of PC to be incremented. Thus, a table of code instruction use, namely table 403, FIG. 4, is generated including data accumulated in associated memory locations on code instruction use of CPU 102. Since PC includes bits representing the virtual address of the instruction, the information stored in table 403 and also table 404 is directly useable by programmer to evaluate code efficiency relative to use of CPU 102. Conditional branch point 510 tests PC by evaluating predetermined bits thereof to determine if CPU 102 is in an idle mode. If the test result is NO, operational block 512 causes predetermined bits of PSL to be evaluated for determining the priority of the kernel code instruction to be executed, causes a count in an associated location in memory 104 to be incremented, i.e., kernel priority 0-N shown in table 404, FIG. 4 and causes a count in a location in memory 104 associated with total kernel instruction use to be incremented. Thereafter, control is transferred to operational block 506. If the test result of conditional branch point 510 is NO, CPU 102 is idle. Operational block 511 causes a location in memory 104 associated with the idle count to be incremented. Operational block 506 causes the clock to be incremented. Thereafter, the PEGIT subroutine is exited via oval 513.

In summary, code instructions to be executed after the occurrence of a clock interrupt pulse are tested via evaluation of predetermined bits of PSL and PC and if in a program module under evaluation representations, i.e., counts of their executions during a predetermined interval are stored for later use. Thus, the code instructions in a program module under evaluation to be executed by CPU 102 after a clock interrupt are essentially sampled and stored for use later in evaluating code use of CPU 102.

Although an embodiment of the invention is described for accumulating data on kernel code instruction use of a CPU, the invention is equally applicable for accumulating similar data on user code and device driver code as will be readily apparent to those skilled in the art. Moreover, instead of incrementing counts in memory locations for accumulating the desired data, it may be advantageous in certain applications to decrement counts in the memory locations.

We claim:

1. In a computer system including a clock generator for generating clock interrupt pulses at a predetermined rate which invoke a clock interrupt process, a central processor unit, and a memory having a plurality of memory locations, wherein in the clock interrupt process, upon occurrence of each of the clock interrupt pulses, the central processor unit generates and stores in predetermined ones of the memory locations first and second code words relating to a corresponding program code instruction to be executed by the central processor unit upon termination of the interrupt process, the first code word including a plurality of bits identifying a module in the program that the corresponding code instruction is in, and the second code word including a plurality of bits representing a virtual address of the corresponding code instruction, a method to be executed by the central processor unit for monitoring program code instruction utilization of the central processor unit, comprising the steps of, determining from said stored first code word bits whether said corresponding code instruction is in a program module under evaluation, determining from said stored second code word virtual address bits a mode of use of the central processor unit by said corresponding code instruction which is in the program module under evaluation, identifying a memory location in said memory assigned to said corresponding code instruction by utilizing predetermined ones of said stored second code word virtual address bits, and incrementing a count of said corresponding code instruction mode of use of the central processor unit stored in said assigned memory location.

2. The method of claim 1 further including a step of incrementing a count in one of said memory locations of said corresponding code instruction which is determined not to be in said program module under evaluation.

3. The method of claim 2 wherein counts of said corresponding code instruction use of the central processor unit are accumulated during a predetermined interval, and further including a step of generating at least one graphical representation of said accumulated counts.

4. The method of claim 2 wherein counts of said corresponding code instruction use of the central processor unit are accumulated during a predetermined interval, and further including a step of generating at least one graphical representation of predetermined ones of said accumulated counts.

5. The method of claim 1 wherein the step of determining said mode of use of the central processor unit includes determining whether said mode of use is a first prescribed mode of use or a second prescribed mode of use.

6. The method of claim 5 wherein said second prescribed mode of use includes a plurality of types of use within said second mode, and if said corresponding code instruction is in said prescribed second mode of use, further including the step of determining from said stored second code word virtual address bits the type of use within said second mode, and wherein said step of incrementing further includes incrementing a count in a memory location assigned to said type of use and incrementing a count in a memory location assigned to accumulate a total count of said second mode of use.

7. The method of claim 5, if said corresponding code instruction is in said first prescribed mode of use, further including the steps of determining whether the mode of use of the central processor unit is idle by utilizing predetermined ones of said stored second code word virtual address bits, and if the mode of use is idle, incrementing a count in a memory location assigned to said idle mode of use.

8. The method of claim 7 wherein said first prescribed mode of use includes a plurality of priorities of use and predetermined bits of said stored first code word identify the priority of said first mode use, and if said corresponding code instruction is in said first prescribed mode of use and it is determined that said mode of use is not idle, further including the steps of determining a priority of use in said first mode by utilizing said stored first code word bits, incrementing a count in a memory location assigned to said priority of first mode use, and incrementing a count in a memory location assigned to accumulate a total count of the first mode use.

9. The method of claim 8 wherein said second prescribed mode of use includes a plurality of types of use within said mode, and if said corresponding code instruction is in said prescribed second mode of use, further including the step of determining from said stored second code word virtual address bits the type of use within said second mode, and wherein said step of incrementing further includes incrementing a count in a memory location assigned to said type of use and incrementing a count in a memory location assigned to accumulate a total count of said second mode of use.

10. The method of claim 9 further including a step of incrementing a count in one of said memory locations of said corresponding code instruction which is determined not to be in said program module under evaluation.

11. The method of claim 10 wherein counts of said corresponding code instruction use of the central processor unit are accumulated during a predetermined interval, and further including a step of generating at least one graphical representation of said accumulated counts.

12. The method of claim 10 wherein counts of said corresponding code instruction use of the central processor unit are accumulated during a predetermined interval, and further including a step of generating at least one graphical representation of predetermined ones of said accumulated counts.

* * * * *